US009618227B2

(12) United States Patent
Drew (10) Patent No.: US 9,618,227 B2
(45) Date of Patent: Apr. 11, 2017

(54) ENERGY MANAGEMENT BASED ON LOCATION (71) Applicant: Emerson Electric Co., St. Louis, MO (US)

(72) Inventor: David Scott Drew, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 513 days.

(21) Appl. No.: 14/201,458

(22) Filed: Mar. 7, 2014

(65) Prior Publication Data

US 2014/0277762 A1 Sep. 18, 2014

Related U.S. Application Data (60) Provisional application No. 61/794,309, filed on Mar. 15, 2013.

(51) Int. Cl.
G01M 1/38 (2006.01)
F24F 11/00 (2006.01)
G05D 23/19 (2006.01)

(52) U.S. Cl.
CPC ...... F24F 11/0086 (2013.01); F24F 11/0012 (2013.01); G05D 23/1904 (2013.01); G05D 23/1905 (2013.01); F24F 2011/0071 (2013.01)

(58) Field of Classification Search
None
See application file for complete search history.

(56) References Cited

U.S. PATENT DOCUMENTS 4,911,358 A * 3/1990 Mehta ............... G05D 23/1904
165/239
7,848,900 B2 12/2010 Steinberg et al.
(Continued)

FOREIGN PATENT DOCUMENTS

CN 1889614 1/2007
CN 102278801 A 12/2011
WO WO2012/092625 7/2012

OTHER PUBLICATIONS

"Adding GPS-Control to Traditional Thermostats: An Exploration of Potential Energy Savings and Design Challenges", M. Gupta, S. Intille and K. Larson; House_n, Massachusetts Institute of Technology, May 11-14, 2009; 18 pgs.

(Continued)

Primary Examiner — Adam Lee
(74) Attorney, Agent, or Firm — Harness, Dickey & Pierce, P.L.C.

(57) ABSTRACT

Systems and methods of providing climate control and/or energy management in a structure having a networking thermostat. In some example embodiments the network is used to monitor a geographic location of a user device associated with a user of the structure. The monitoring may be performed to determine the location relative to a destination located apart from the structure. The network is used to control a set point of the thermostat based on the location. Additionally or alternatively, the monitoring may be performed to determine time period(s) during which the structure is unoccupied and the thermostat is set at a first set point. Energy savings that could have been realized by changing the first set point to a second set point are estimated and provided to the user.

16 Claims, 9 Drawing Sheets

(56) References Cited

U.S. PATENT DOCUMENTS

| | | |
|---|---|---|
| 7,908,116 B2 | 3/2011 | Steinberg et al. |
| 7,908,117 B2 | 3/2011 | Steinberg et al. |
| 7,930,070 B2 | 4/2011 | Imes |
| 8,010,237 B2 | 8/2011 | Cheung et al. |
| 8,019,567 B2 | 9/2011 | Steinberg et al. |
| 8,024,073 B2 | 9/2011 | Imes et al. |
| 8,082,065 B2 | 12/2011 | Imes et al. |
| 8,090,477 B1 | 1/2012 | Steinberg |
| 8,099,195 B2 | 1/2012 | Imes et al. |
| 8,108,076 B2 | 1/2012 | Imes et al. |
| 8,131,497 B2 | 3/2012 | Steinberg et al. |
| 8,131,506 B2 | 3/2012 | Steinberg et al. |
| 8,174,381 B2 | 5/2012 | Imes et al. |
| 8,180,492 B2 | 5/2012 | Steinberg |
| 8,265,798 B2 | 9/2012 | Imes |
| 8,350,697 B2 | 1/2013 | Trundle et al. |
| 8,359,007 B2 | 1/2013 | White et al. |
| 8,386,082 B2 | 2/2013 | Oswald |
| 2005/0194455 A1* | 9/2005 | Alles .............. F24F 3/0442 236/1 B |
| 2010/0004997 A1* | 1/2010 | Mehta .............. G06Q 30/02 705/14.66 |
| 2010/0033296 A1 | 2/2010 | Dong et al. |
| 2010/0077243 A1* | 3/2010 | Wang .............. G06F 1/3209 713/323 |
| 2010/0185552 A1* | 7/2010 | DeLuca .......... G06Q 30/0282 705/347 |
| 2010/0193592 A1* | 8/2010 | Simon ............ F24F 11/0012 236/51 |
| 2010/0282857 A1 | 11/2010 | Steinberg |
| 2010/0289643 A1* | 11/2010 | Trundle .......... F24F 11/0086 340/545.1 |
| 2010/0308119 A1 | 12/2010 | Steinberg et al. |
| 2010/0318227 A1 | 12/2010 | Steinberg et al. |
| 2011/0015802 A1 | 1/2011 | Imes |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0106316 A1* | 5/2011 | Drew .............. G05D 23/1902 700/278 |
| 2011/0202185 A1* | 8/2011 | Imes .............. H04L 43/08 700/277 |
| 2011/0214060 A1 | 9/2011 | Imes et al. |
| 2011/0224838 A1 | 9/2011 | Imes et al. |
| 2011/0231020 A1 | 9/2011 | Ramachandran et al. |
| 2011/0246898 A1 | 10/2011 | Imes et al. |
| 2011/0258048 A1 | 10/2011 | White et al. |
| 2011/0264290 A1 | 10/2011 | Drew |
| 2011/0290893 A1 | 12/2011 | Steinberg |
| 2011/0307101 A1 | 12/2011 | Imes et al. |
| 2011/0307103 A1 | 12/2011 | Cheung et al. |
| 2012/0013548 A1* | 1/2012 | Choi .............. B60K 35/00 345/173 |
| 2012/0023225 A1 | 1/2012 | Imes et al. |
| 2012/0031984 A1* | 2/2012 | Feldmeier ........ F24F 11/001 236/49.3 |
| 2012/0046859 A1 | 2/2012 | Imes et al. |
| 2012/0064923 A1 | 3/2012 | Imes et al. |
| 2012/0065783 A1 | 3/2012 | Fadell et al. |
| 2012/0065789 A1* | 3/2012 | Scelzi .............. G01K 17/20 700/291 |
| 2012/0065935 A1 | 3/2012 | Steinberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0135759 A1 | 5/2012 | Imes et al. |
| 2012/0158350 A1 | 6/2012 | Steinberg et al. |
| 2012/0186774 A1 | 7/2012 | Matsuoka et al. |
| 2012/0191257 A1 | 7/2012 | Corcoran et al. |
| 2012/0232969 A1 | 9/2012 | Fadell et al. |
| 2012/0310416 A1 | 12/2012 | Tepper et al. |
| 2012/0323385 A1 | 12/2012 | Thiruvengada et al. |
| 2013/0073094 A1* | 3/2013 | Knapton .......... F24F 11/0034 1/34 |

OTHER PUBLICATIONS

"Home Heating Using GPS-Based Arrival Prediction", J. Scott, J. Krumm, B. Meyers, A.J. Brush and A. Kapoor; Microsoft Research; Feb. 24, 2010; 6 pgs.

"A Persuasive GPS-Controlled Thermostat System", M. Gupta; Submitted to MIT Sep. 2008; 89 pgs.

"Using Your Mobile Phone as a Proximity Sensor", R. MacManus; Jan. 25, 2010; 7 pgs.; www.readwriteweb.com.

Chinese Office action issued in Chinese Patent of Invention Application No. 201410260417.1, dated Mar. 3, 2016, which claims priority to the instant application; 7 pgs.

\* cited by examiner

John Smith
5555 Anywhere Lane ← 504
City, State Zip
A/C ########
Cooling Database
Comfort Set point  76° ← 508
Set Back Amount  +1°  +2°  +3°  +4°  +5°  +6°  +7°  +8°  +9°  +10°  ← 520

| Outdoor Temp | Breakeven Period (minutes) | | | | | | | | | |
|---|---|---|---|---|---|---|---|---|---|---|
| | +1° | +2° | +3° | +4° | +5° | +6° | +7° | +8° | +9° | +10° |
| 110 | 10 | 20 | 30 | 40 | 50 | 60 | 70 | 80 | 90 | 100 |
| 109 | 10 | 20 | 30 | 40 | 50 | 60 | 70 | 80 | 90 | 100 |
| 108 | 11 | 22 | 32 | 42 | 52 | 62 | 72 | 82 | 92 | 102 |
| 107 | 11 | 22 | 32 | 42 | 52 | 62 | 72 | 82 | 92 | 102 |
| 106 | 12 | 24 | 34 | 44 | 54 | 64 | 74 | 84 | 94 | 104 |
| 105 | 12 | 24 | 34 | 44 | 54 | 64 | 74 | 84 | 94 | 104 |
| 104 | 13 | 26 | 36 | 46 | 56 | 66 | 76 | 86 | 96 | 106 |
| 103 | 13 | 26 | 36 | 46 | 56 | 66 | 76 | 86 | 96 | 106 |
| 102 | 14 | 28 | 38 | 48 | 58 | 68 | 78 | 88 | 98 | 108 |
| 101 | 14 | 28 | 38 | 48 | 58 | 68 | 78 | 88 | 98 | 108 |
| 100 | 15 | 30 | 40 | 50 | 60 | 70 | 80 | 90 | 100 | 110 |
| 99 | 16 | 32 | 42 | 52 | 62 | 72 | 82 | 92 | 102 | 112 |
| 98 | 17 | 34 | 44 | 54 | 64 | 74 | 84 | 94 | 104 | 114 |
| 97 | 18 | 36 | 46 | 56 | 66 | 76 | 86 | 96 | 106 | 116 |
| 96 | 20 | 40 | 50 | 60 | 70 | 80 | 90 | 100 | 110 | 120 |
| 95 | 22 | 44 | 54 | 64 | 74 | 84 | 94 | 104 | 114 | 124 |
| 94 | 24 | 48 | 58 | 68 | 78 | 88 | 98 | 108 | 118 | 128 |
| 93 | 27 | 54 | 64 | 74 | 84 | 94 | 104 | 114 | 124 | 134 |
| 92 | 30 | 60 | 70 | 80 | 90 | 100 | 110 | 120 | 130 | 140 |
| 91 | 33 | 66 | 76 | 86 | 96 | 106 | 116 | 126 | 136 | 146 |
| 90 | 36 | 72 | 82 | 92 | 102 | 112 | 123 | 132 | 142 | 152 |
| 89 | 39 | 78 | 88 | 98 | 108 | 118 | 128 | 138 | 148 | 158 |
| 88 | 42 | 84 | 94 | 104 | 114 | 124 | 134 | 144 | 154 | 164 |
| 87 | 45 | 90 | 100 | 110 | 120 | 130 | 140 | 150 | 160 | 170 |
| 86 | 48 | 96 | 106 | 116 | 126 | 136 | 146 | 156 | 166 | 176 |
| 85 | 51 | 102 | 112 | 122 | 132 | 142 | 152 | 162 | 172 | 182 |
| 84 | 53 | 106 | 116 | 126 | 136 | 146 | 156 | 166 | 176 | 186 |
| 83 | 56 | 112 | 122 | 132 | 142 | 152 | 162 | 172 | 182 | 192 |
| 82 | 60 | 120 | 130 | 140 | 150 | 160 | 170 | 180 | 190 | 200 |
| 81 | 65 | 130 | 140 | 150 | 160 | 170 | 180 | 190 | 200 | 210 |
| 80 | 70 | 140 | 150 | 160 | 170 | 180 | 190 | 200 | 210 | 220 |
| 79 | 75 | 150 | 160 | 170 | 180 | 190 | 200 | 210 | 220 | 230 |
| 78 | 85 | 170 | 180 | 190 | 200 | 210 | 220 | 230 | 240 | 250 |
| 77 | 95 | 190 | 200 | 210 | 220 | 230 | 240 | 250 | 260 | 270 |

ENERGY MANAGEMENT BASED ON LOCATION

CROSS-REFERENCE TO RELATED APPLICATION

This application claims the benefit of U.S. Provisional Application No. 61/794,309 filed on Mar. 15, 2013. The entire disclosure of the above application is incorporated herein by reference.

FIELD

The present disclosure relates to energy management based on location.

BACKGROUND

This section provides background information related to the present disclosure which is not necessarily prior art.

Homeowners generally want to minimize their utility bills. Home heating, ventilation and air conditioning (HVAC) systems, which typically account for about half of residential utility energy usage, can provide opportunities for cost savings. Most homeowners, however, are not willing to make significant sacrifices of comfort or exert significant effort to achieve such savings.

SUMMARY

This section provides a general summary of the disclosure, and is not a comprehensive disclosure of its full scope or all of its features. Exemplary embodiments or implementations are disclosed of methods, apparatus, and systems for providing climate control in a structure having a thermostat connected with a network.

In one exemplary implementation, the disclosure is directed to a system for providing climate control in a structure. The system includes a thermostat of the structure. The thermostat is connected with a network. One or more processors are connected with the thermostat through the network and are configured to monitor a geographic location of a user device associated with a user of the structure. The monitoring is performed to determine the geographic location in relation to a destination located apart from the structure. The processor(s) are configured to determine a set point for the thermostat based on the geographic location.

Another exemplary implementation is directed to a system-performed method of providing climate control in a structure. The method includes monitoring a geographic location of a user device associated with a user of the structure. The monitoring is performed to determine the geographic location in relation to a destination located apart from the structure. The method further includes using a network through which the system is connected with a thermostat of the structure to control a set point of the thermostat based on the geographic location.

In another exemplary embodiment, the disclosure is directed to a system for providing energy management relative to a structure. The structure has a thermostat connected with the system in a network. One or more processors are configured to use the network to monitor the thermostat and a geographic location of a user device associated with a user of the structure, to determine one or more time periods during which the structure is unoccupied and during which the thermostat is set at a first set point. The processor(s) are configured to determine an estimate of energy savings that could have been realized by changing the first set point to a second set point during at least part of the time period(s). The processor(s) are further configured to provide the estimate to the user.

In another exemplary implementation, the disclosure is directed to a system-performed method of providing energy management relative to a structure. The structure has a thermostat connected with the system through a network. The method includes monitoring the thermostat and a geographic location of a user device associated with a user of the structure to determine one or more time periods during which the structure is unoccupied and during which the thermostat is set at a first set point. The method further includes shortening one of the time periods by a breakeven duration to obtain a time period over which energy costs could have been reduced by changing the first set point to a second set point, determining an estimate of an amount by which the energy costs could have been reduced, and providing the estimate to the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventor has observed that many people do not have fixed or predictable schedules so as to be able to take advantage of various cost saving opportunities available through the use of programmable thermostats. The inventor also has observed that "smart phones" and similar devices make it possible to obtain the current geographic location of someone who is carrying such a phone or device. Further, it is possible to connect a residential thermostat that has a wireless networking capability with a remote server, via a network such as the Internet. It thus becomes possible to remotely and automatically set and/or change the thermostat set point, e.g., based on user location.

Accordingly, in various embodiments of the present disclosure, various home energy management methods and systems are supported by a capability to remotely access a programmable thermostat. For example, a wireless-communication-enabled thermostat in a home or other structure can be accessed over a network to provide temperature setback and/or temperature recovery remotely and automatically, based at least in part on the location of a user's smart phone or similar device. In some embodiments, a control algorithm for determining, e.g., a time duration and number of degrees for a period of temperature setback in a structure is dynamically adaptable based, e.g., on outdoor temperature, the structure's thermal profile, and the closest user's geographic location relative to the structure. Such an application can enhance energy savings as compared to conventional setback period scheduling, without compromising comfort and without significant engagement on the part of users.

Unless indicated otherwise, the term "comfort" is used herein to refer to a temperature setting intended to provide a desired comfort level, e.g., during a time period in which a structure is assumed to be occupied. Unless indicated otherwise, the term "setback" is used herein to refer to a setback of climate control operation, e.g., during a time period in which occupants are assumed to be away from a structure. Thus a "setback temperature" or "temperature setback" for a cooling system would typically be higher than a comfort temperature for that system, and a setback temperature for a heating system would typically be lower than a comfort temperature for that system. Additionally or alternatively, the term "setback" may at times be used herein to refer to a degree offset from a comfort set point. It should be noted generally that although various embodiments may be described herein in relation to a user's residence (e.g., home), the disclosure is not so limited. Various embodiments are possible in relation to virtually any type of structure, including but not limited to commercial buildings, offices, etc., in which it is desired to implement energy management as described herein.

Figure 1:
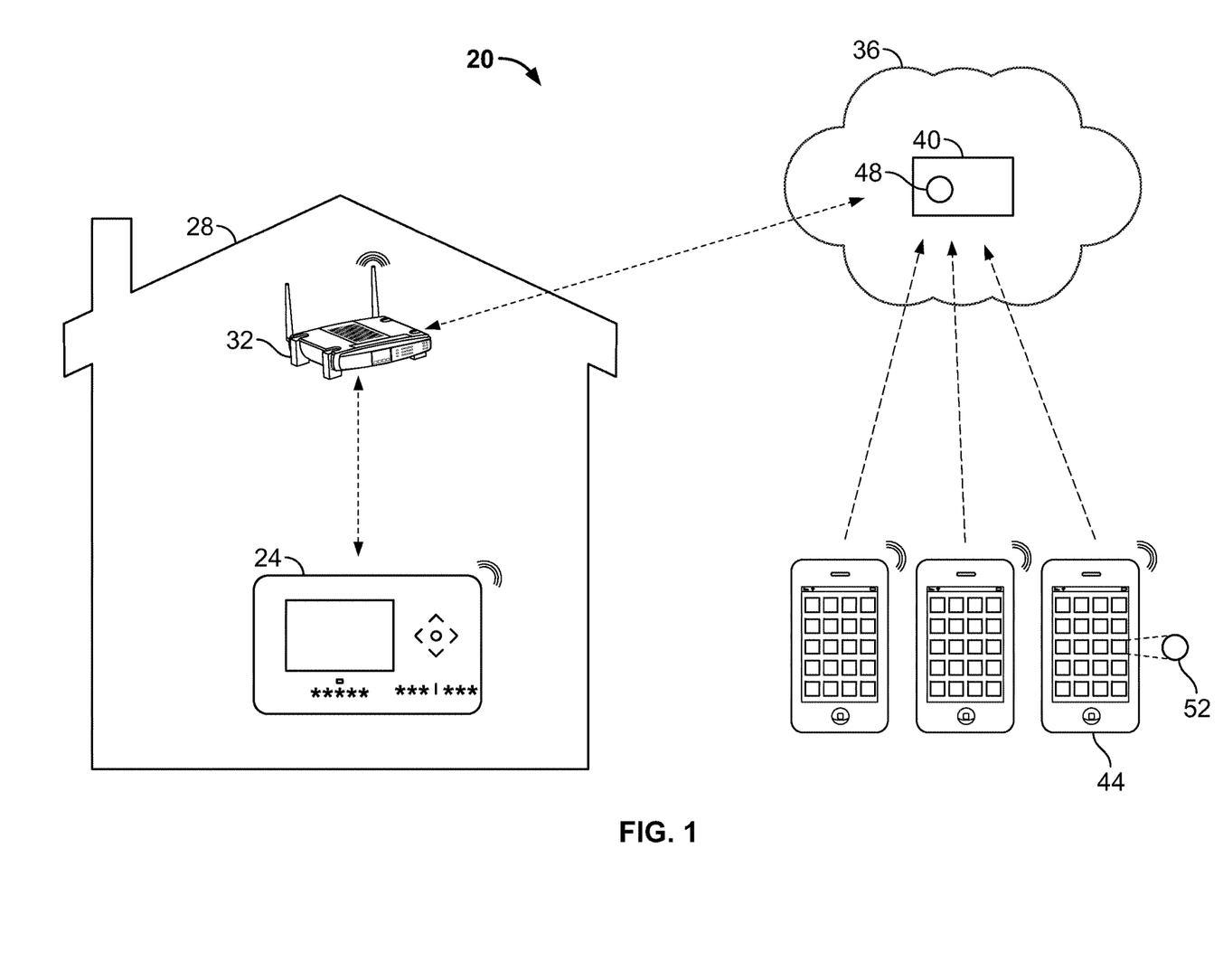
FIG. 1 is a diagram of a system for providing location-based energy management configured in accordance with an exemplary implementation of the present disclosure.

With reference to the figures, FIG. 1 is a diagram of an exemplary system 20 for home energy management. A programmable thermostat 24 is installed in a structure 28, e.g., a residence, and is used for controlling a climate control system (not shown) of the structure 28. The thermostat 24 is wirelessly connected with a router 32, which provides wireless access to a wide-area network 36 such as the Internet and/or cellular network(s). At least one server 40 is capable of wirelessly connecting with the thermostat 24 and is configured to provide energy management services to users of the structure 28 through one or more user devices 44, e.g., one or more smart phones, as further described below.

A user device 44 includes a capability for determining and providing geographic locations, e.g., Global Positioning Service (GPS) and/or other location service. A user device 44 may include (without limitation) a mobile device such as a cellular or mobile phone, a smart phone such as a Blackberry®, an Android® device, an I-Phone® or I-Pad®, that can communicate using wireless communication, including but not limited to Wi-Fi, 802.11-based, WiMAX, Bluetooth, Zigbee, 3G, 4G, subscriber-based wireless, PCS, EDGE, and/or other wireless communication means, or any combination thereof.

In various embodiments, an energy management service provider may make a web portal 48 available to users, e.g., on or through the server(s) 40. Additionally or alternatively, a user may employ a mobile application 52 on his/her user device 44 to access home energy management services and/or to remotely control the thermostat 24. The server 40 may be included, e.g., in a "cloud" server site in which various analyses may be performed to provide real-time energy management services. In one implementation of a method of providing energy management services in accordance with the disclosure, a user, e.g., an owner of the structure 28, obtains the wireless-communication-enabled thermostat 24, manufactured, e.g., by Emerson Electric Co. of St. Louis, Mo. The user or an installer installs the thermostat 24 in the structure 28 and provisions the thermostat 24 to the router 32.

In some embodiments the installer or user creates an energy management account for the user on the portal 48 for the provision of energy information and management services as further described below. In some embodiments, setting up such an account includes entering a make and model of climate control equipment in the structure 28, square footage of the structure 28, and/or other data pertaining to energy management for the structure 28. A user may enter preferences for energy management through the portal 48. For example, the user may enter desired temperature settings for the thermostat 24 for various stages of occupancy and/or non-occupancy, e.g., for "home", "sleep", and "away". Additionally, if the user wishes to operate the thermostat 24 based on a schedule, the user may enter a schedule or modify a default schedule provided for the thermostat 24. As further described below, in some embodiments a user's schedule may be used as a baseline to determine an amount of incremental energy savings that could be obtained through energy management services. A user downloads the energy management mobile application 52 onto his/her user device 44. While the GPS or other location service is operational, the user can use his/her user device 44 to remotely control operation of the thermostat 24 through the server(s) 40. In some embodiments a user may subscribe for the provision of location-based services by the energy management service provider.

Figure 2:
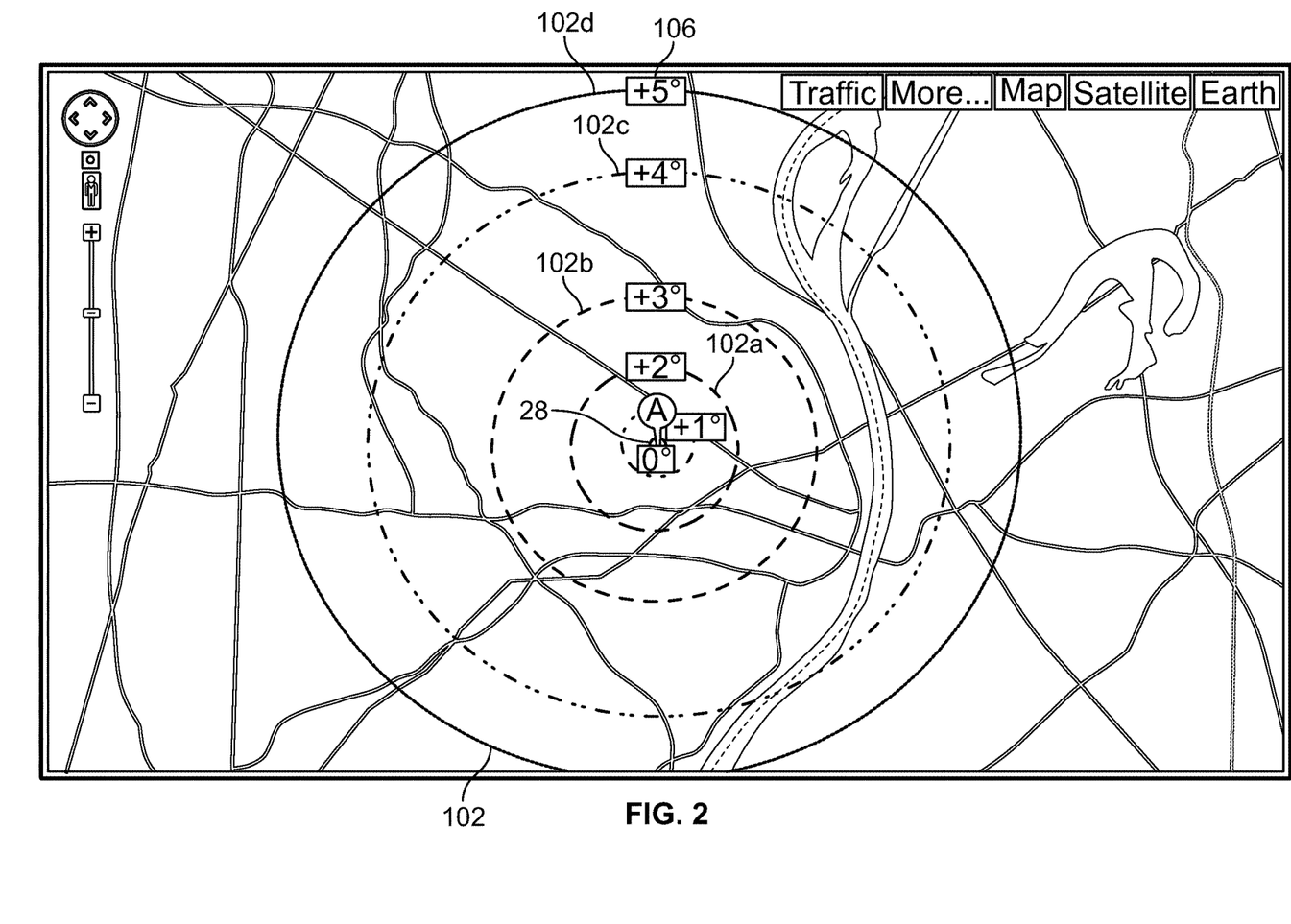
FIG. 2 is a diagram of setback rings configured in accordance with an exemplary implementation of the disclosure.

Location-based services may be provided, e.g., as follows. In one embodiment of the disclosure, and as shown in FIG. 2, the system 20 is configured to establish one or more fixed setback rings 102 around the structure 28. In the present example there are four setback rings (102a, 102b, 102c, 102d). The setback ring(s) 102 may be established, e.g., based on one or more offsets 106 to a user-selected comfort temperature setting of the thermostat 24. When a user of the structure 28 passes through a given setback ring 102, the server 40 may automatically send a temperature change request to the thermostat 24. For example, the server 40 may send a temperature change request based on the user-device-reported location of a user who is nearer to the structure 28 than any other user associated by the system 20 with the structure 28. In the example embodiment shown in FIG. 2, each setback ring 102 is configured to provide a change in the temperature maintained by a cooling system of the structure 28. If, e.g., the nearest user is moving away from the structure 28 and passes through the setback ring 102a, the server 40 sends a request to the thermostat 24 to increase the current temperature set point in the structure 28 to the comfort set point plus two degrees. When the closest user reaches the outermost setback ring 102d, the system 20 requests the thermostat 24 to increase the current temperature set point to the comfort set point plus 5 degrees. When all of the users of the structure 28 are outside the setback rings 102, the temperature set point remains at 5 degrees over the comfort set point. As a user moves toward the structure 28, the system 20 causes the thermostat 24 to gradually decrease the temperature set point in accordance with the setback rings 102 so that the temperature in the structure 28 is once again at the user-selected comfort setting by the time the user reaches the structure 28. In one example implementation, while a user is, e.g., within 150 feet of the structure 28, the system 20 maintains the user-selected comfort set point, and a one-degree offset may be provided for every 1 to 2 miles from the structure 28. Thus, e.g., where a user's comfort point is set at 76 degrees and the user is 5 miles from the structure 28, the set point inside the structure 28 may be automatically set at 79 degrees. It should be noted that a setback ring is not necessarily circular but could have various shapes to account, e.g., for geographic features affecting speed and directions of travel, traffic congestion, etc.

In various example embodiments, the system 20 takes into account the effects of a structure's thermal properties, and/or impact(s) of outdoor temperature and/or other weather conditions, on setback and/or set point recovery. For example, the system 20 may dynamically adjust setback ring location(s) based on how well a particular structure retains heat and cool, and efficiency of HVAC equipment installed in a structure (e.g., how long it would take for the structure to recover from a setback event,) under a given set of outdoor conditions. In some embodiments the system 20 communicates with the thermostat 24 to obtain data for use in predicting how long it would take for temperature in the structure 28 to reach a target set point (e.g., to recover a comfort set point) after being set back, under various outdoor conditions. For example, the system 20 may measure and record (a) a slope of temperature recovery in the past under identical weather conditions, and/or (b) a slope of temperature recovery that was identified in a preceding recovery period and assume that the current slope is similar.

Figure 3A:
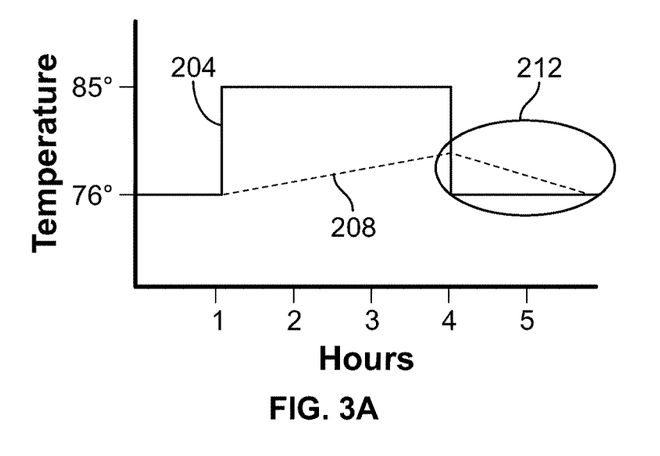
FIGS. 3A through 3D are graphs of thermostat set points and ambient temperatures over time in various structures.
Figure 3B:
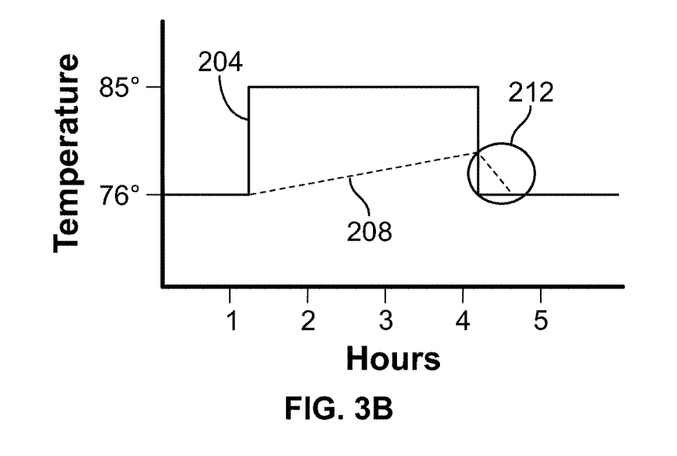
Figure 3C:
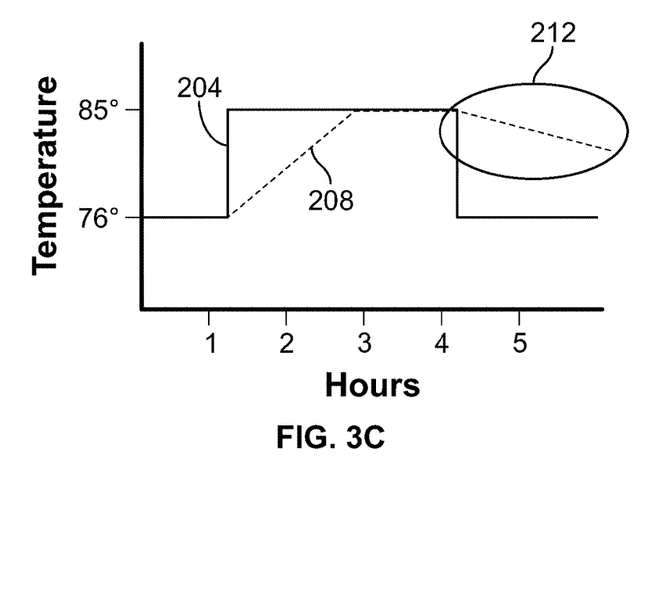
Figure 3D:
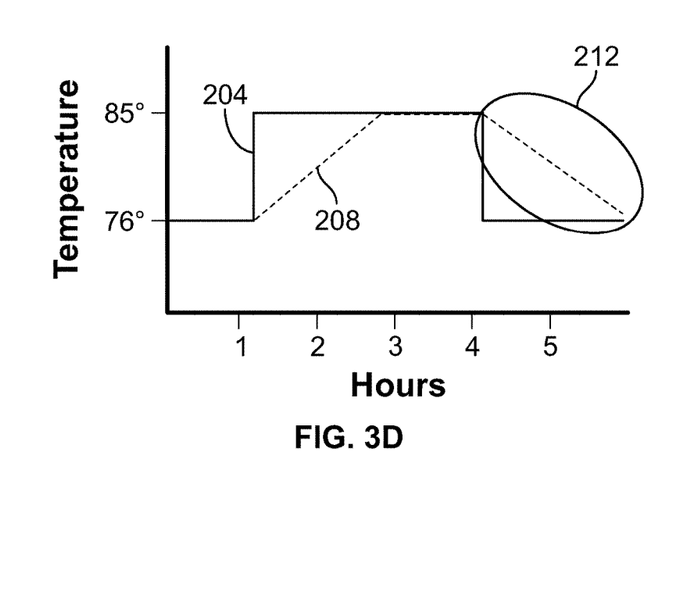

FIGS. 3A through 3D illustrate how ambient inside temperature may vary over time in four air-conditioned structures. It is assumed for FIGS. 3A-3D that outside temperature is 95 degrees. In each of the FIGS. 3A through 3D, a solid line 204 represents a thermostat set point and a dotted line 208 represents ambient temperature inside the structure. In each of the FIGS. 3A through 3D the temperature, initially set to a comfort set point of 76 degrees, is changed to a setback temperature of 85 degrees after one hour, and is returned to the 76-degree comfort set point after four hours. In each of the FIGS. 3A through 3D, a circled portion 212 of the dotted line 208 represents temperature recovery after the thermostat setting is returned to the comfort set point. FIG. 3A shows how ambient temperature changes inside a structure having a tight thermal envelope and an undersized air conditioner. The slope of the temperature recovery 208 is one degree for every 40 minutes. FIG. 3B shows how ambient temperature changes inside a structure having a tight thermal envelope and an oversized air conditioner. The slope of the temperature recovery 208 is one degree for every 10 minutes. FIG. 3C shows how ambient temperature changes inside a structure having a loose thermal envelope and an undersized air conditioner. The slope of the temperature recovery 208 is one degree for every 60 minutes. FIG. 3D shows how ambient temperature changes inside a structure having a loose thermal envelope and an oversized air conditioner. The slope of the temperature recovery 208 is one degree for every 20 minutes.

It can be seen from FIGS. 3A and 3B that where a home has a very tight thermal envelope, it is more difficult for the ambient inside temperature to reach a setback temperature than would be the case for a comparable home that has a loose thermal envelope. The level at which the setback set point is set is more relevant to comfort and cost saving in the types of structures described in FIGS. 3C and 3D, because it is typically desirable to make the setback set point as high as possible, yet still ensure that the air conditioner in the structure will be capable of returning the ambient temperature to a comfort set point, e.g., at or near the time a user returns home.

A user, then, might prefer to adjust an ambient temperature based on cost saving, or alternatively based on comfort. If cost saving is preferred, then, e.g., a house could be allowed to have an ambient temperature a few degrees above a comfort set point when the user walks in the door (with the thermostat set to the comfort set point.) In some embodiments, various setback rings could be set for various structures so as to optimize energy savings while maintaining comfort. Slopes of temperature recovery are useful in determining optimal location(s) of setback rings. For example, a user whose home takes 60 minutes to recover one degree would need to have very sparsely located rings, perhaps, e.g., one ring every 30 miles. On the other hand, where a home can recover one degree every 10 minutes, it might have very tightly located rings, e.g., one every two miles.

Similarly, a home with a loose thermal envelope (e.g., no insulation, old windows, etc.) and an undersized air conditioner might not be capable of having a setback temperature, e.g., of more than 3 or 4 degrees. Where it would take such a long time to recover from setback, any higher level could be likely to compromise comfort. A four-degree setback ring might need to be located, e.g., 100 miles from such a home.

In some example embodiments, a home arrival time may be predicted based on numerous factors, including (for example and without limitation) a user's distance from home, average speed (e.g., rate of movement), historical average time period required for a user's return to the home from the same destination or a similar distance, during the same time of day, etc. Once it is determined how long it would take for a structure to recover from a setback under various outdoor conditions, such data may be combined with prediction of home arrival time(s) to place setback ring(s) in location(s) that would optimize energy savings while providing an acceptably comfortable temperature when a user returns to the home.

In some example embodiments, (a) duration of time that a user is away from home and (b) outdoor temperature are included as factors for determining an energy management strategy for a given home. In some embodiments such factors are used to address the management of dual fuel systems. Cloud-based analysis may be performed, e.g., as to a given home that has a heat pump and a furnace to determine, e.g., whether it would be cost-effective to maintain a comfort set point via the heat pump regardless of whether the home is occupied or unoccupied. Such might be the case where, e.g., it would take an inordinate amount of time for a heat pump to recover from a setback set point. Another approach might be to provide a setback offset of several degrees for the heat pump and use the furnace for recovery.

Destinations

At times users may spend long periods of time at locations that are close, e.g., to home. Possible energy savings might not be realized where default setback rings are in place, e.g., for an urban structure. In some urban environments, 95% of the time that a user may spend away from home is time spent within a 5-mile radius around the home. Thus in one example embodiment, the system 20 maintains a database of "destinations" for each user of the structure 28. In some embodiments a user may explicitly identify a destination, e.g., the user's workplace, to the system 20. Additionally or alternatively, the system 20 may maintain a history of locations visited by a user and, after the user has made a predefined number of visits to a given location, the system 20 may identify that location as a "destination." In one example embodiment a destination is defined as a location where the user is stationary for longer than a predefined time period, e.g., two hours, and that has been visited by the user more than a predefined number of times, e.g., more than once, within a predefined time period, e.g., within the last three months.

After a destination has been identified, an average duration of historical visits may be recorded and updated to determine an appropriate setback temperature for the next user visit to the destination. For example, assume that a user frequently visits a destination that is one mile from the user's home for an average duration of eight hours per visit (e.g., the user works close to home.) Given such duration, it could be possible to achieve a setback of, e.g., eight degrees offset from a comfort set point, rather than, e.g., a default setback of a 1- or 2-degree offset for that distance. Recovery from such a setback could begin at a time that would allow recovery of the comfort set point to be completed before the end of the eight-hour duration.

To accommodate movement from a destination that may or may not be movement back home, e.g., if a user leaves a work destination to go to lunch, the system 20 may activate a setback ring at a predetermined distance between the home and the destination, e.g., at 75% of the distance between the home and the destination. In some embodiments, a user may input information to the system 20 pertinent to establishing such a setback ring, e.g., traffic patterns, locations of "sub-destinations" such as favorite lunchtime restaurants, etc. If the user stays between the activated setback ring and the destination, the system 20 continues to maintain the current setback set point (e.g., the setback of 8 degrees offset from a comfort set point as previously discussed.)

If the user passes through the activated setback ring, the system 20 may stop monitoring the user's travel based on destination and may, e.g., monitor the user's travel based on another method, e.g., in relation to other setback ring(s) established for the user's home, e.g., as default(s). Referring to the above example, if a default setback ring for the home in currently prevailing weather conditions calls for a 3-degree offset from comfort set point based on distance from the home, the 8-degree setback would be changed, e.g., to 3 degrees. Thus the setback amount may be progressively reduced to recover the comfort set point, as the user gets closer to home.

Quantification of Energy Savings

In some implementations of the disclosure, energy savings may be determined, e.g., for a user's home by determining how far to set back a thermostat when the home is unoccupied, and when to start temperature recovery, so as to optimize the user's comfort, convenience and cost savings. Such a determination may be made based, e.g., on (a) location of one or more occupant's smart phone(s), (b) how quickly an HVAC system in the home can change the internal temperature of the home when running, and (c) how well the home can retain heat and cool when the HVAC system is off.

How quickly an HVAC system in the home can change the internal temperature may be determined, e.g., by plotting the following variables relative to time: outdoor temperature, indoor ambient temperature, thermostat set point, and HVAC system run time. How well the home can retain heat and cool when the HVAC system is off may be determined, e.g., by plotting the following variables relative to time: outdoor temperature, indoor temperature, and thermostat set point.

In various embodiments the system 20 provides measurement and verification capabilities as to a user's structure and occupancy patterns that can be used to quantify possible and actual energy cost savings. Data logged by the system 20 can include but is not necessarily limited to data relating to how long a home can retain heat and/or cool when the home's HVAC system is not operating, and how long it takes the home to recover from a setback set point. Such data can be used, e.g., to determine a "breakeven duration" for a home, i.e., an amount of time during which no energy savings can be gained via setback.

Figure 4:
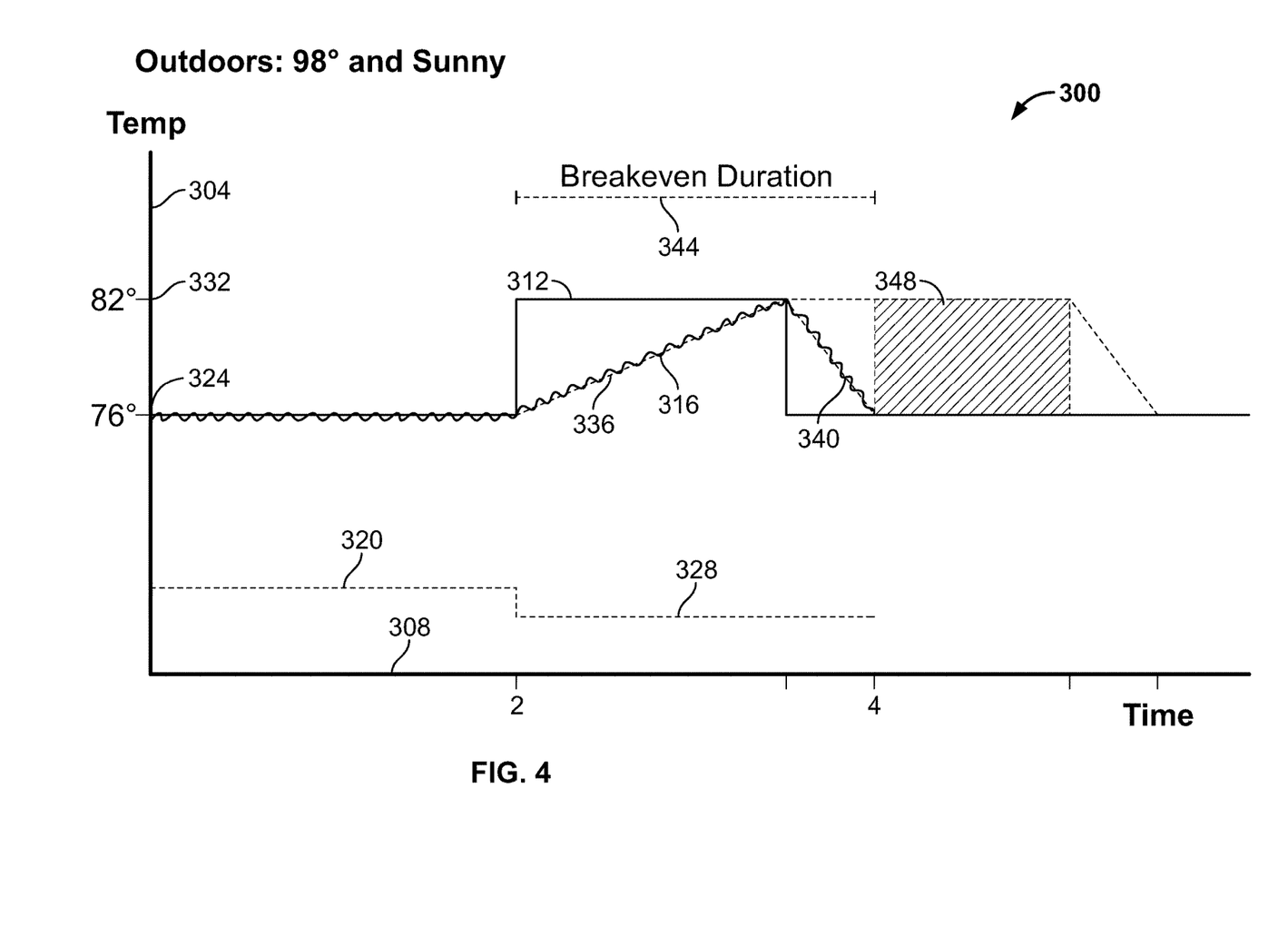
FIG. 4 is a graph of thermostat set points and ambient temperatures over time, and in which is shown a breakeven duration configured in accordance with an exemplary implementation of the disclosure.

Referring to FIG. 4 and in one example implementation of the disclosure, a breakeven duration and a quantification of energy savings may be determined for a structure. A graph 300 shows temperature 304 over time 308 for a given structure. A solid line represents an air conditioner set point temperature 312 and a wavy line represents ambient inside temperature 316. In the present example, under normal operating conditions the air conditioner compressor might cycle on/off several times during a two-hour window 320 to maintain a comfort set point 324, e.g., of 76° when an outdoor temperature is, e.g., 98°. It is assumed in this example that to maintain the 76° temperature for two hours, the compressor is on for a total of 45 minutes. If, e.g., the user were to set back the thermostat by 6 degrees to a setback temperature of 82° at the beginning of a two-hour window 328, the air conditioner compressor might be off, e.g., for the first 1 hour and 15 minutes, at which point it would begin cycling (with less time spent running) to maintain the new set point 332 of 82°. But if the user were to return home after being away for 1 hour and 15 minutes and were to change the set point back to the 76° comfort temperature, the air conditioner would run continuously for 45 minutes to bring the home back to 76°, thereby negating any potential savings from the setback. (The slope of a line 336 is indicative of how "tight" the thermal properties of the structure are, and the slope of a line 340 is indicative of how long it takes for the structure to return to the comfort set point 324.) Thus a breakeven duration 344 of 2 hours is determined for the foregoing example structure in view of its thermal properties and air conditioning equipment, the example temperature set points, and the example outdoor temperature. During the breakeven period 344, there is no net gain in energy savings by setting back the thermostat. After the breakeven duration has passed, substantially any amount of time during which the thermostat was still set back can be logged and analyzed by the system 20 in terms of energy savings. A hatched area 348 can be used by the system 20 to quantify energy savings under the foregoing example conditions.

A breakeven duration for a cooling system is typically a function of a structure's thermal properties, size/condition of its HVAC system, and the outdoor temperature. Although the first two elements tend to be fixed, the outdoor temperature fluctuates substantially continuously. In some embodiments, the system 20 includes a database for each user's home showing its breakeven duration under substantially every outdoor temperature, e.g., for heating and/or cooling of the home.

In one example method in accordance with the disclosure, the service provider provides energy information to a user through the portal 48 and/or mobile application 52. The information is specific, e.g., to the user's home. For example, the user may be shown run times for climate control equipment in the user's home, as determined by the system 100, e.g., via the network 36 from the thermostat 24. In some embodiments the user is prompted to enter make (s)/model(s) of the climate control equipment through the portal 48 or mobile application 52. The system 20 may make use of such information to convert run time data into energy cost estimates. To provide such estimates the system 20 may retrieve equipment-specific information, e.g., rated load information from source(s) such as a national database or manufacturer's literature. A rated load then may be multiplied by run time and the user's regional energy cost(s), which may also be available in a national database.

In addition to providing energy information, the home energy management service provider may provide location-based energy management services, e.g., as described above, through the system 20 to users who subscribe to the location-based services. In various embodiments, the service provider may provide user-specific information to a user who has not yet subscribed to location-based services. For example, the service provider may determine and show to the user any setback opportunities as described above that could have saved money for the user if the user had made use of location-based services.

Figure 5:
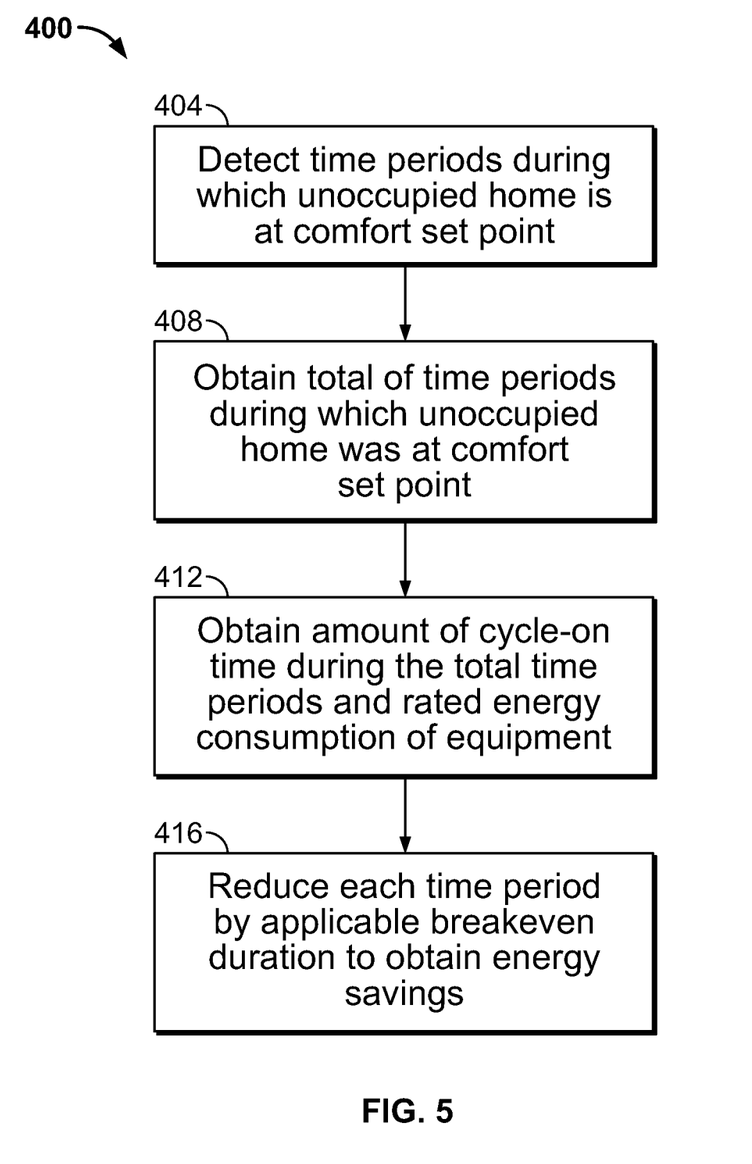
FIG. 5 is a flow diagram of a method of determining thermostat setback opportunities in accordance with an exemplary implementation of the disclosure.

Such setback opportunities may be determined, e.g., in accordance with an embodiment of a method indicated in FIG. 5 by reference number 400. The system 20 may communicate with the user's thermostat 24 to obtain set point data for the user's climate control system. In process 404 the system 20 uses thermostat set point data and location information obtained through the location service of a user's user device 44 to detect time periods during which the home's climate control system is set at a comfort set point while the home is unoccupied. At a given time, e.g., at the end of the month, the system 20 may obtain in process 408 a total of hours during which the home's climate control system was set at a comfort set point while the home was unoccupied. The system 20 also obtains in process 412 the amount of cycle-on time during the total of hours and the rated energy consumption of the home's climate control equipment, based on equipment make(s)/model(s). From such information may be determined the total amount of energy consumed during the time that the home was unoccupied and a given comfort set point was in place. In order to determine possible energy savings through location-based energy management, in process 416 the system 20 subtracts from each such time period a breakeven duration applicable to the time period.

In one example implementation, the system 20 may identify 50 hours during which the home's climate control system was set at a comfort set point while the home was unoccupied. The system 20 also may know the amount of cycle-on time during those 50 hours and rated energy consumption of the air conditioner based on the make/model. For example, where the compressor was on for 30 of the 50 hours (while maintaining a set point of 76°) and when the air conditioner is on, that particular model draws 3.5 kilowatt hours. The system 20 thus could infer a total amount of energy consumed during the time that the home was unoccupied and a comfort set point was in place. Data analysis may be performed to estimate how much less the air conditioner would have run if the set point were 82° instead of 76°. Assuming that it would have been 18 hours instead of 30, it is not inferred in the present example implementation that 30 hours of on time (at 76°) minus 18 hours of on time (at 82°) is the amount of energy saved, i.e., 12 hours of runtime. Rather, in various implementations a breakeven duration is accounted for in every period during which the home was unoccupied and the 76-degree set point was in place. If, e.g., each of the 50 hours of unoccupied time at 76 degrees was a one-hour trip away from the home, then setting back the set point to 82° possibly would not have saved any energy at all. Thus in various embodiments, energy savings are claimed for those time periods ("energy savings time periods"), if any, in which a home is unoccupied at a comfort set point where the time period is in excess of the applicable breakeven duration.

Figure 6:
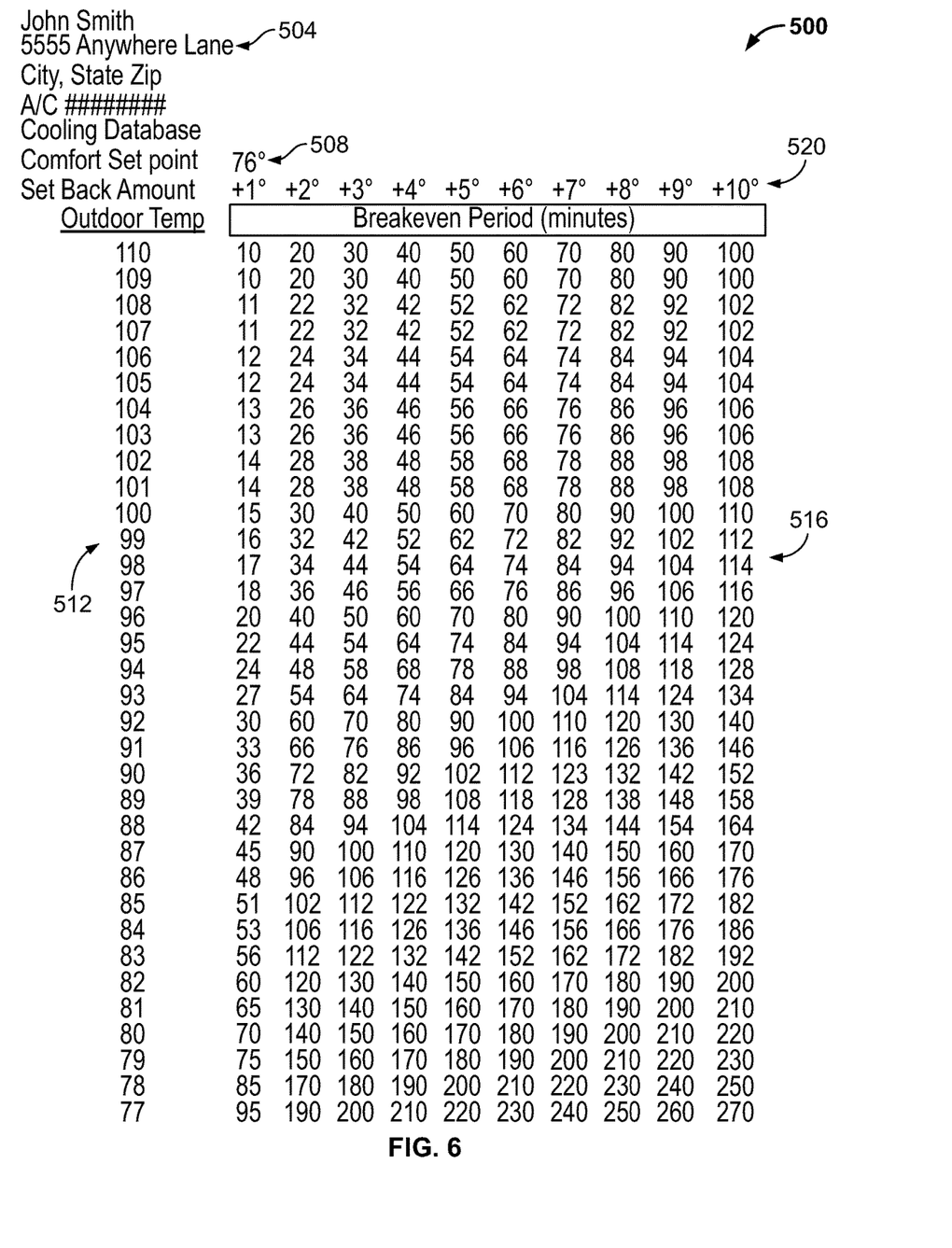
FIG. 6 is an illustration of a breakeven duration table configured in accordance with an exemplary implementation of the disclosure.

In various embodiments the system 20 is configured to maintain a database including breakeven durations applicable to a user's structure. One example table of breakeven durations for a given structure is indicated generally in FIG. 6 by reference number 500. The table 500 is applicable to cooling of a structure associated with a given user account 504. For a given comfort set point 508 and for a plurality of outdoor temperatures 512, a plurality of breakeven durations 516 are provided for a plurality of setback amounts 520. Such tables may be provided, e.g., for various comfort set points and various types of cooling, heating and/or other climate control equipment provided in a structure.

In one example embodiment, the system 20 informs a user who has not subscribed to location-based management services as to how much money the system 20 estimates that the user could have saved through location-based energy management. To provide such information, the system 20 identifies the appropriate electric and/or gas utilities, e.g., based on input from the user to the portal 48 or mobile application 52. The system 20 obtains the utility rates applicable to the user, e.g., from the utilities, from a rate database, and/or based on input from the user. The system 20 applies the rate data to "energy savings time periods" to obtain estimates of money spent on energy during those periods.

Figure 7A:
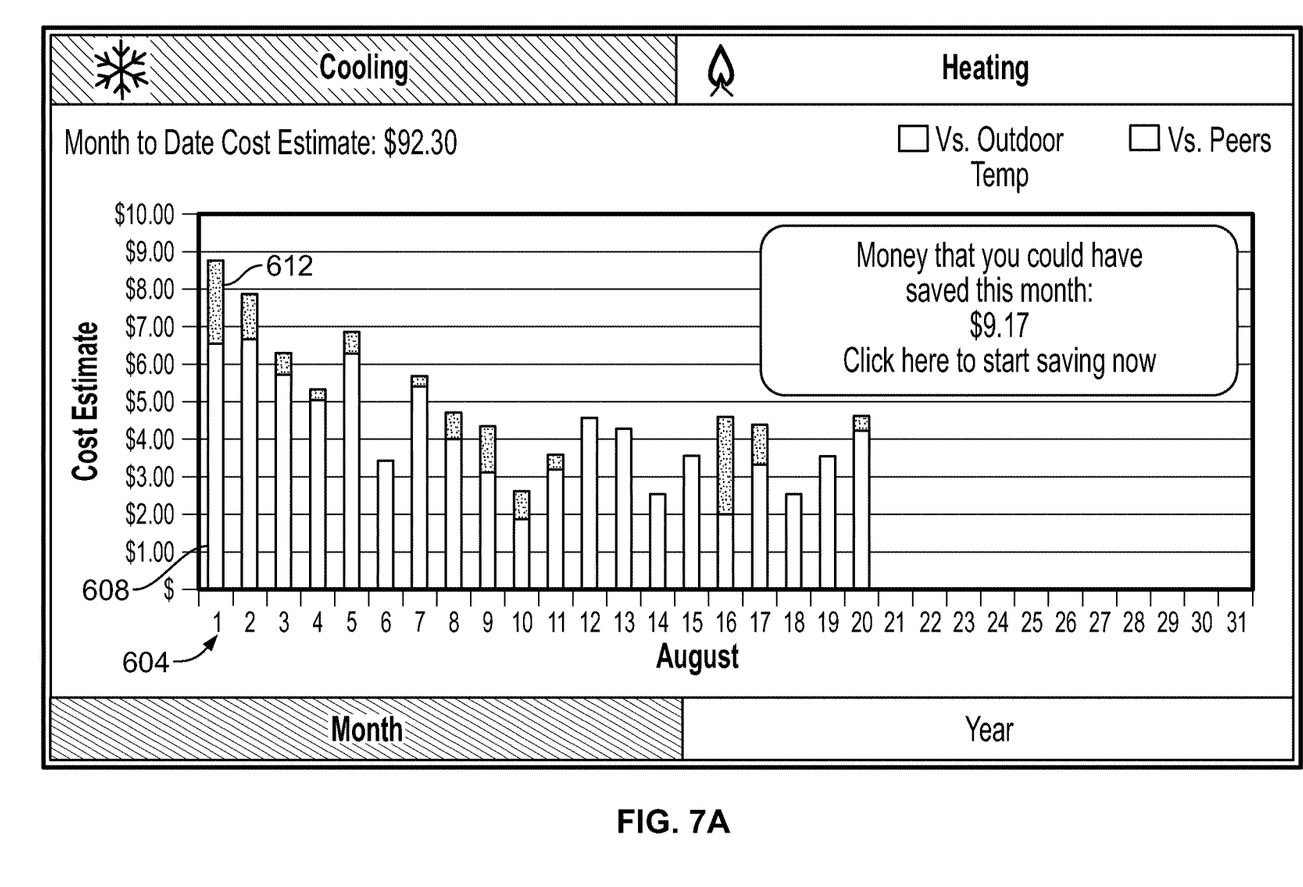
FIGS. 7A through 7C are screenshots of information describing missed opportunities for energy cost saving.
Figure 7B:
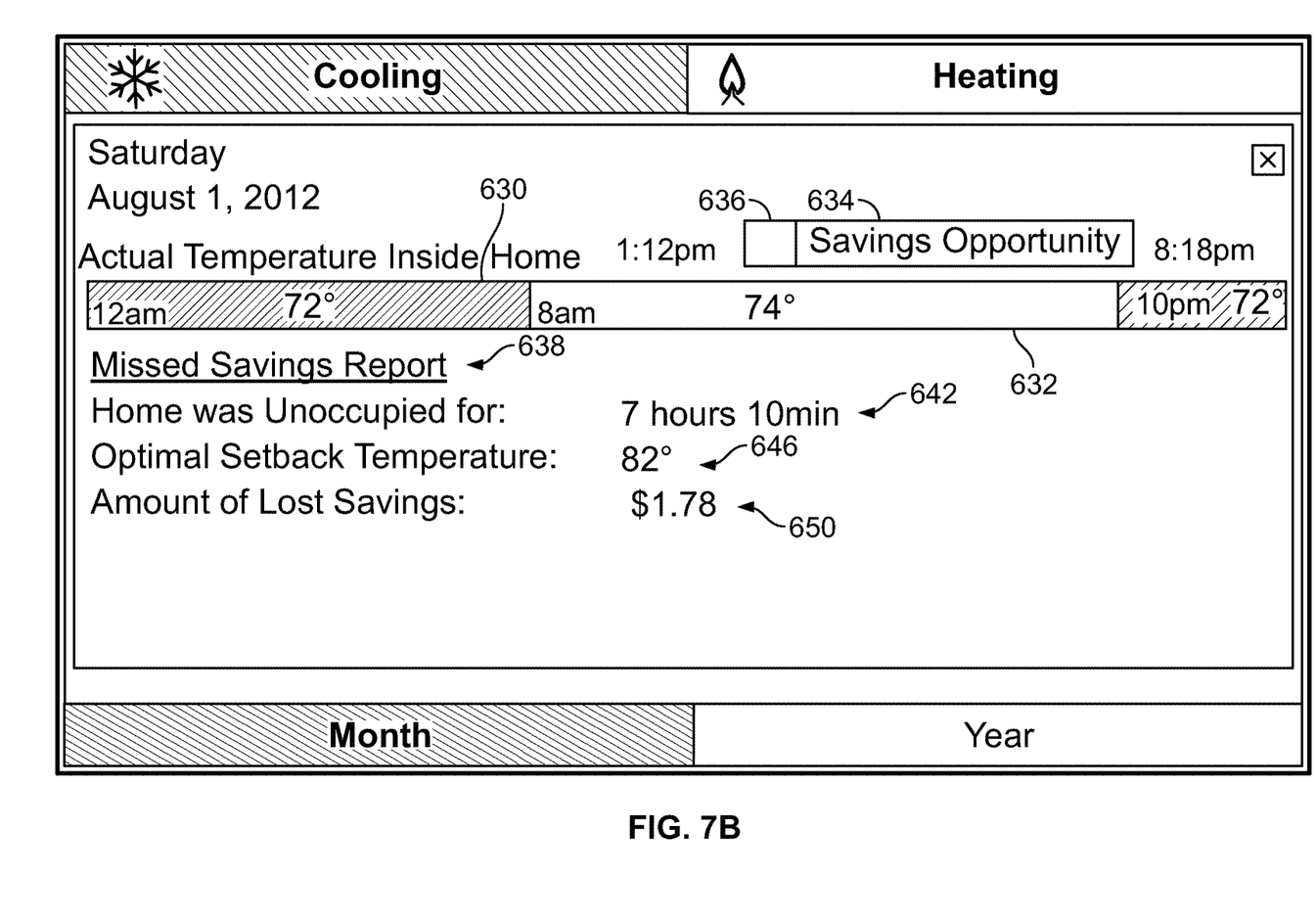
Figure 7C:
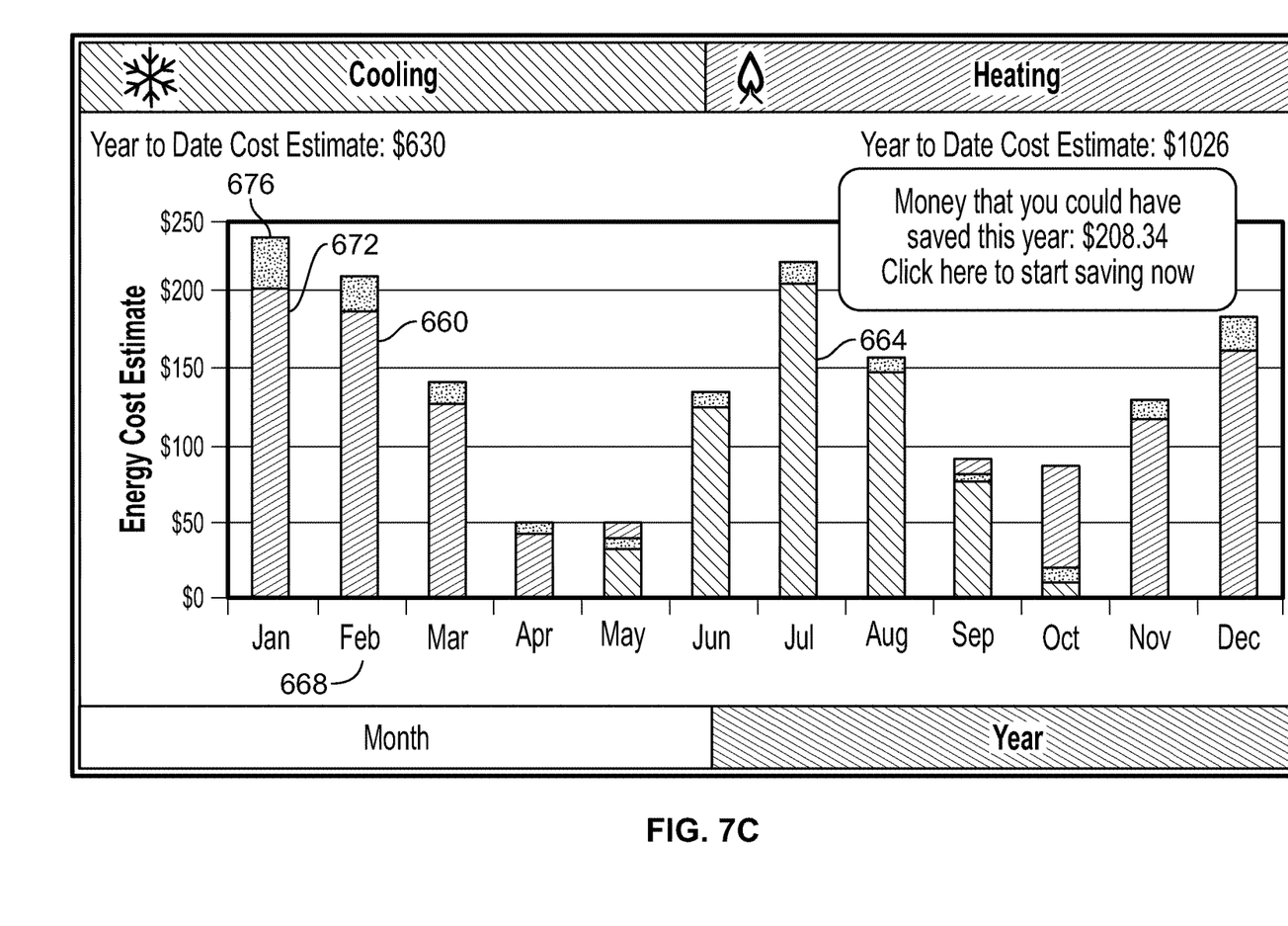

FIGS. 7A-7C illustrate examples of screenshots that may be made available to a user via the portal 48 or mobile application 52. FIG. 7A provides an estimate of how much money a given user might have saved in cooling costs over a month-to-date period. For each day 604, a column 608 represents a total actual daily cost estimate. A portion 612 of the column 608 represents an estimate of money that could have been saved had the user subscribed to location-based energy management services. If the user "clicks" on or otherwise activates a portion 612, a screen is provided, e.g., as shown in FIG. 7B. A time line 630 for the day indicates actual temperature inside the home. A bar 632 indicates a time period during which the structure was unoccupied. A bar portion 634 is shown that indicates a total time period over which the system 20 estimates that energy cost savings could have been realized after a breakeven period, which is indicated by a bar portion 636. A "missed savings" report 638 for the selected day shows unoccupied time 642 for the user's home and an optimal setback temperature 646 for the home. An estimated total 650 of lost savings for that day also is provided. An example screen shot providing year-end information is shown in FIG. 7C. Both heating and cooling cost estimates 660 and 664 are shown for the year and for each month 668. For each month 668 a column 672 represents a total actual monthly cost estimate. A portion 676 of a column 672 represents an estimate of money that could have been saved had the user subscribed to location-based energy management services.

When a user subscribes to location-based management services in one example embodiment, the system 20 uses the same or similar analysis as described above, to show the user an estimate of how much money the services actually saved the user, e.g., by day, month, and/or year.

By way of example only, exemplary embodiments of methods and systems disclosed herein can provide one or more of the following advantages over other energy management methods and systems. The foregoing methods and systems leverage users' existing broadband/Wi-Fi infrastructure to connect a user's thermostat to a server that provides energy management services. Further, the location services provided in users' smart phones are leveraged, e.g., to determine occupancy and users' distances from home. Thus a user who has a smart phone and a Wi-Fi router and thermostat at home has essentially all of the hardware needed for implementing the foregoing systems and methods.

Through the use of location services in smart phones or similar devices, and through the use of cloud-based data analysis, users' comfort, cost savings and convenience all are well served. A home, for example, could essentially always be kept at a temperature preferred by an occupant. If, e.g., a husband's favorite temperature is 76 degrees and he is home alone, the temperature could be kept at 76 degrees. On the other hand, if the wife prefers 78 degrees and she is home alone, the house could be kept at 78 degrees. (A compromise of 77 degrees perhaps could be established when both spouses are at home.) When geographic location (s), e.g., of occupant(s) of a home can be determined more or less at any time, a temperature setting in the home can be changed to recover from a setback period before the occupant(s) arrive home. The home, then, can be at or close to a desired comfort setting when the occupant(s) arrive home.

When it is determined that the occupants of a home are absent and the home is unoccupied, a thermostat can be automatically set to a setback temperature for a period based on actual user behavior. This capability is in contrast to setting temperatures based on a fixed time schedule that may or may not be consistent with the actual behavior of the occupants. Further, embodiments in which actual user location, structural data, temperature data and HVAC system information are used to automate thermostat settings are in contrast to methods that adjust thermostat settings based on predictions of future patterns of user occupancy.

In various implementations of the disclosure, without having to do much (if anything,) a homeowner can save money while maintaining comfort. No longer would there be any need for a homeowner to micromanage a thermostat set point when coming and going. This would be the case also for users of mobile applications for energy management configured in accordance with various embodiments of the disclosure.

The above mentioned possible advantages are provided for purposes of illustration only, and do not limit the scope of the present disclosure. Exemplary embodiments of methods and systems disclosed herein may provide one or more of the above advantages, all of the above advantages, none of the above advantages, or combinations thereof.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for providing climate control in a structure, the system comprising:
   a thermostat of the structure, the thermostat connected with a network; and
   one or more processors connected with the thermostat through the network and configured to:
      monitor a geographic location of a user device associated by the system with a user of the structure, the monitoring performed to determine the geographic location in relation to a destination located apart from the structure and previously identified as a destination visited by the user; and
      determine a set point for the thermostat based on the geographic location and a breakeven duration, wherein the breakeven duration represents a time period during which no net gain of energy savings would have been obtained and is based on one or more thermal properties of the structure, an outdoor temperature, and a setback temperature for the structure; and
      control the thermostat via the network, based on the determined set point.

2. The system of claim 1, wherein the one or more processors are configured to:
   store a historical average duration of visits by the user device to the destination; and
   use the historical average duration and a distance between the structure and the destination to determine a setback temperature at which to set the thermostat set point for a future visit to the destination.

3. The system of claim 1, wherein the one or more processors are configured to set the thermostat to a predetermined setback temperature via the network when the user device is determined to be arriving at the destination.

4. The system of claim 1, wherein the one or more processors are configured to determine the set point based on the breakeven duration, the breakeven duration further based on a type of climate control equipment in the structure.

5. The system of claim 1, wherein the one or more processors are configured to determine the set point for the thermostat based on the geographic location of the user device relative to one or more of the following: a setback ring between the structure and the destination, a traffic pattern, and a sub-destination associated by the system with the destination.

6. A system-performed method of providing climate control in a structure, the method comprising:
   monitoring a geographic location of a user device associated by the system with a user of the structure, the monitoring performed to determine the geographic location in relation to a destination located apart from the structure and previously identified as a destination visited by the user;
   determining a set point for a thermostat of the structure based on the geographic location and a breakeven duration, wherein the breakeven duration represents a time period during which no net gain of energy savings would have been obtained and is based on one or more thermal properties of the structure, an outdoor temperature, and a setback temperature for the structure; and
   using a network through which the system is connected with the thermostat of the structure, controlling the thermostat based on the determined set point.

7. The method of claim 6, comprising:
   storing a historical average duration of visits by the user device to the destination; and
   determining a setback temperature at which to set the thermostat set point for a future visit to the destination, the determining performed using the historical average duration and a distance between the structure and the destination.

8. The method of claim 6, comprising setting the thermostat to a predetermined setback temperature via the network when the user device is determined to be arriving at the destination.

9. The method of claim 6, comprising:
   determining the breakeven duration further based on a type of climate control equipment in the structure; and
   determining the thermostat set point based on the breakeven duration.

10. The method of claim 6, further comprising determining the set point of the thermostat based on the geographic location of the user device relative to one or more of the following: a setback ring between the structure and the destination, a traffic pattern, and a sub-destination of the destination.

11. A system for providing energy management for a structure, the structure having a thermostat connected with the system in a network, the system comprising one or more processors configured to:
   use the network to monitor the thermostat and a geographic location of a user device associated by the system with a user of the structure to determine one or more time periods during which the structure is unoccupied and during which the thermostat is set at a first set point;
   shorten at least one of the one or more time periods by a determined breakeven duration to obtain at least part of the one or more time periods, wherein the breakeven duration represents a time period during which no net gain of energy savings would have been obtained and is based on one or more thermal properties of the structure, an outdoor temperature, and a setback temperature for the structure;
   determine an estimate of energy savings that could have been realized by changing the first set point to a second set point during the at least part of the one or more time periods;

provide the estimate to the user and receive user input in response to the estimate; and change the first set point of the thermostat based on the user input.

12. The system of claim 11, wherein the determined breakeven duration is further based on a type of climate control equipment in the structure.

13. The system of claim 11, wherein the first set point comprises a comfort set point and the second set point comprises a setback set point.

14. A system-performed method of providing energy management for a structure, the structure having a thermostat connected with the system through a network, the method comprising:

monitoring the thermostat and a geographic location of a user device associated by the system with a user of the structure to determine one or more time periods during which the structure is unoccupied and during which the thermostat is set at a first set point;

shortening at least one of the one or more time periods by a determined breakeven duration to obtain at least part of the one or more time periods, wherein the breakeven duration represents a time period during which no net gain of energy savings would have been obtained and is based on one or more thermal properties of the structure, an outdoor temperature, and a setback temperature for the structure;

determining an estimate of an amount by which energy costs could have been reduced by changing the first set point to a second set point during the at least part of the one or more time periods;

providing the estimate to the user and receiving user input in response to the estimate; and changing the first set point of the thermostat based on the user input.

15. The method of claim 14, wherein the determined breakeven duration is further based on a type of climate control equipment in the structure.

16. The method of claim 14, wherein the first set point comprises a comfort set point and the second set point comprises a setback set point.

* * * * *